Aug. 1, 1950     W. E. SIRI     2,517,511
PARACHUTE RELEASE MECHANISM
Filed March 7, 1947     2 Sheets—Sheet 1

INVENTOR.
WILLIAM E. SIRI
BY Wade Koonty and
Frederick W. Cotterman
HIS ATTORNEYS Aug. 1, 1950 W. E. SIRI 2,517,511
PARACHUTE RELEASE MECHANISM
Filed March 7, 1947 2 Sheets-Sheet 2
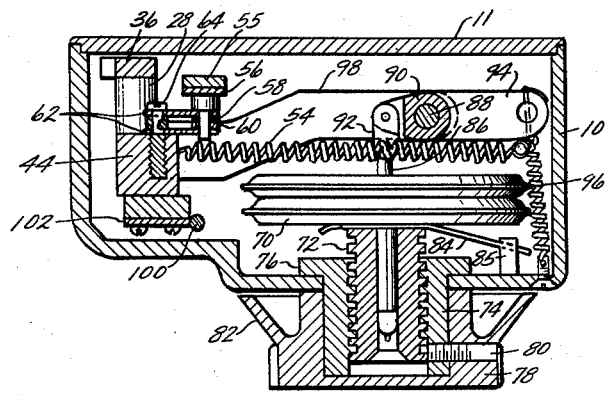
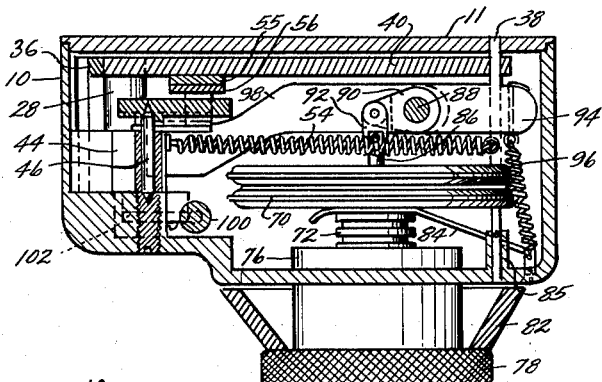
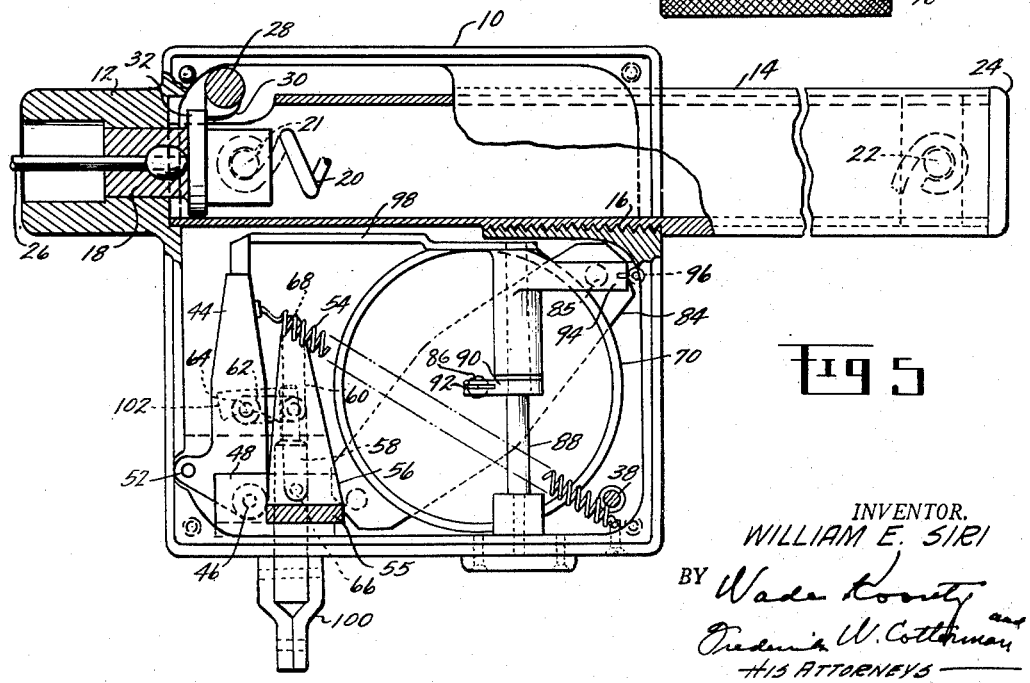
INVENTOR.
WILLIAM E. SIRI Patented Aug. 1, 1950

2,517,511

UNITED STATES PATENT OFFICE 2,517,511

PARACHUTE RELEASE MECHANISM

William E. Siri, Berkeley, Calif., assignor to the United States of America as represented by the Secretary of War Application March 7, 1947, Serial No. 733,133

5 Claims. (Cl. 244—150)

This invention relates to a parachute release mechanism and more particularly to a mechanism for automatically releasing a parachute at a selected altitude.

An object of the invention is to provide a device which may be used in connection with a conventional parachute pack and which includes means to pull the rip cord automatically at a preselected altitude.

Another object is to provide an improved parachute release mechanism which is simple in construction, positive in operation and inexpensive to build.

More specifically an object of the invention is to provide a device including a spring or other resilient means in which power may be manually stored, together with a barometric device for releasing said spring and performing work at a selected atmospheric pressure, and means for preselecting the pressure at which said releasing means will become operative.

Figure 1:
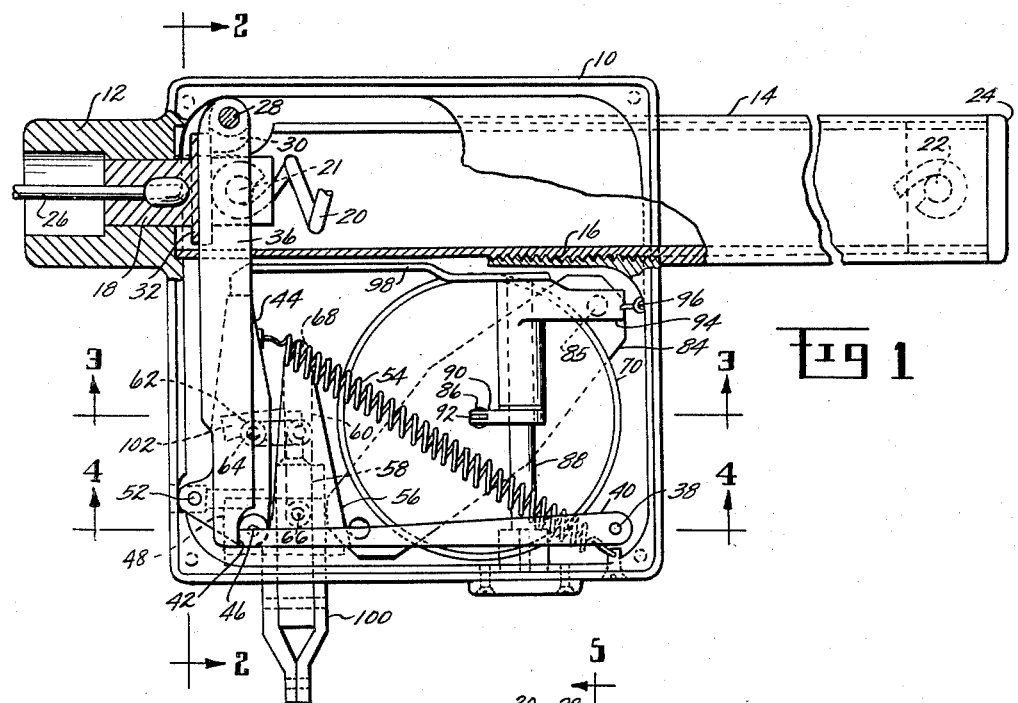

Other objects, advantages and meritorious features will become evident as the invention is hereinafter described in detail with reference to the drawing, wherein, Fig. 1 is a top plan view of an embodiment of my invention with the housing cover removed to show the interior construction, a small portion of the housing being shown in section for clearness.

Figure 2:
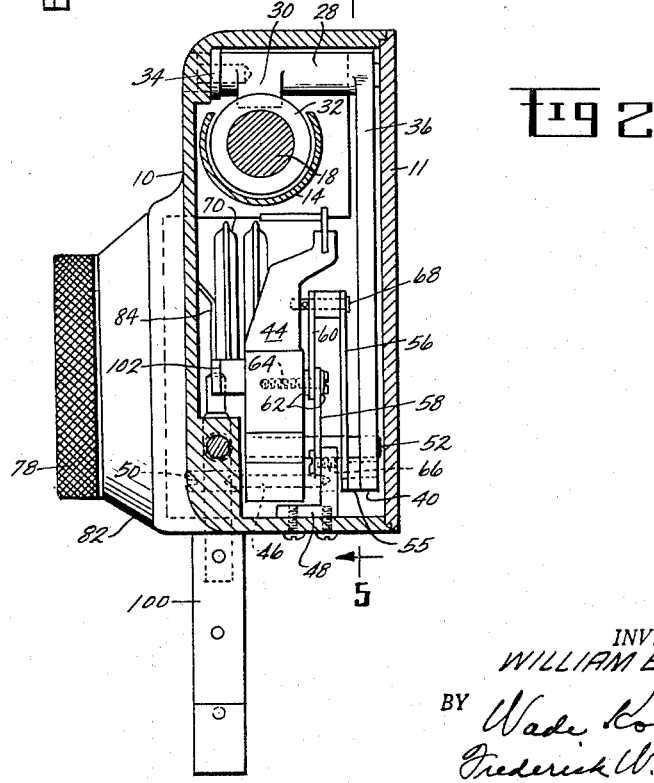

Figs. 2, 3, and 4 are sectional views taken at 2—2, 3—3 and 4—4, respectively, of Fig. 1.

Fig. 5 is a sectional view taken at 5—5 of Fig. 2.

Like reference characters designate like parts throughout the several views.

Referring now to the drawing, a housing 10 having a cover 11 is provided externally with a hub 12, and, concentrically with said hub there is a spring barrel 14 which is threadedly secured in the housing at 16. A small piston 18 is slidably fitted to a bore in the hub 12 and is biased rightwise by an extension coil spring 20, the spring 20 being anchored at the left hand end to the piston 18 by a pin 21, and at the right hand end by a pin 22 which passes through the slotted plug 24 and through the eye of the spring which lies in the slot. A cable 26 has an end secured in the piston 18. The piston 18 may be drawn leftwise to its spring loaded position manually by the cable 26, the free end of the cable being adapted for attachment to the device to be operated, in the instant case, to the rip cord of a parachute.

Rotatably supported at its opposite ends in the housing 10 and cover 11 is a latch shaft 28 carrying an integral latch dog 30, the latch shaft 28 being adapted to be rocked clockwise so as to swing the lower end of the dog 30 leftwise into engagement with a flange 32 on the piston 18. A keyhole 34, Fig. 2, in the lower end of the shaft 28 is provided, whereby a key may be inserted and the shaft 28 turned from outside the casing 10 until the dog 30 engages the flange 32 whereby the latch shaft 28 is biased for anticlockwise rotation.

Secured to and extending forwardly from the upper end of the latch shaft 28 is a latch arm 36. Diagonally opposite the latch shaft 28 and having its ends journaled in the housing 10 and cover 11 is a shaft 38. A trip lever 40 is fast at one end on the shaft 38, the other end being adapted to swing into and out of engagement with the swingable end of the latch arm 36. In the drawing the swingable end of the trip lever 40 is shown at 42, Fig. 1, resting against the swingable end of the latch arm 36 thereby holding the latch arm 36 in the set position.

For the purpose of tripping the trip lever 40 to release the latch arm 36, there is provided a linkage which includes a release arm 44 which is fast on a shaft 46, the shaft having pivot bearing at the upper end in a bracket 48 extending from the inner side of the housing 10 and, at the lower end in the end of an adjusting screw 50, Fig. 2. A stop pin 52 extends vertically from the release arm 44 to limit its travel by engagement with the latch arm 36. An extension spring 54 has one end secured to the free end of the release arm 44 and the other end to the housing 10 whereby the release arm 44 is biased for clockwise rotation about the pivot shaft 46.

Rigidly fixed to a block 55 on the underside of the trip lever 40 and extending substantially at right angles therefrom is a trip lever operating arm 56. The two links 58 and 60 of a toggle joint have their inner ends hinged together and to the right hand end of a pair of toggle operating links 62. The left hand ends of the toggle operating links 62 are hinged at 64 to the release arm 44. The outer end of the toggle link 58 is hinged at 66 to the bracket 48, while the outer end of the toggle link 60 is hinged at 68 to the outer end of the trip lever operating arm 56. It is noted that if the release arm 44 is rocked in a clockwise direction about its shaft 46 by the spring 54, the hinge point 68 of the operating arm 56 will be drawn forwardly by the toggle link 60, thereby rotating the trip lever 40 anticlockwise about its shaft 38, whereby the free end of the trip lever 40 at 42 is moved forwardly out of engagement with the latch arm 36 allowing the latch arm to be rotated anticlockwise by the spring 20 to the position which opens the parachute.

A barometric device is provided which is operative to hold the latch arm 36, trip lever 40, release arm 44 and operating linkage 56, 58, 60, 62 in the set position shown in the drawing whenever the device is above a selected altitude but becomes inoperative to hold these parts in the set position whenever the device is below the said selected altitude.

The barometrically operative unit of the mechanism consists of a sealed bellows or multiple diaphragm 70 carried on the upper end of a screw 72. A nut 74 which is internally threaded to fit the screw 72 has a flange 76 inside the housing and a hand knob 78 on the nut outside the housing, the hand knob being secured to the nut by a small screw 80 whereby rotation of the hand knob 78 raises or lowers the bellows 70 bodily and expansion or contraction of the fluid which is sealed in the bellows 70 due to a change in altitude raises or lowers the upper side of the bellows with respect to the lower side. The hand knob 78 has a skirt 82 which carries indicia selectively registerable with corresponding indicia on the adjacent surfaces of the housing. The indicia is not shown in the drawing. The graduations are readable in terms of altitude. A leaf spring 84 supported on studs 85 prevents backlash in the altitude selective part of the unit. A rod 86 is fast to the upper side of the bellows 70 for movement therewith.

Rotatably supported in the housing 10 is a shaft 88. Shaft 88 carries a lever system which includes a short arm 90 connected by a link 92 to the upper end of the rod 86, a spring arm 94 to the outer end of which one end of an extension spring 96 is hooked, the other end being secured to the housing 10, and a trip arm 98, the free end of which props the release arm 44 in the set position shown when the device is above the selected altitude but withdraws and permits the release arm to rotate clockwise and trip the mechanism when the device is at or below the selected altitude.

Since the barometric unit is operative only to keep the mechanism in the set condition when the device is above a selected altitude, and it is desirable that the device be put in the set condition when on the ground before going aloft, a manual means is provided for maintaining the set condition until an altitude is reached which will cause the barometric unit to function. This manual means consists of a key 100 which is insertable into an opening in the housing 10, the key having an inner end which is adapted to slide alongside a dog 102 which is fast to the underside of the release arm 44. When the key 100 is thus inserted in the housing as shown, the release arm 44 will remain in the set condition irrespective of the condition of the barometric unit.

When the term clockwise or anticlockwise is hereinafter employed unless otherwise designated it shall be taken to mean clockwise or anticlockwise when viewed as in Fig. 1.

The embodiment of the invention herein shown and described is to be used substantially as follows:

Preferably, before the pilot goes aloft, he pulls the cable 26 to the left, against the resistance of the spring 20, as far as it will go; inserts a key from below into the keyhole 34 and turns the latch shaft 28 clockwise until the dog 30 is stopped by the piston flange 32; inserts the key 100 which pushes against the dog 102 and thereby turns the release arm 44 anticlockwise into the set position shown and coincidentally, by means of the toggle 58, 60, 62, draws the trip lever 40 into the position shown where its end, props the latch arm 36 in the set position as at 42. The selector knob may now be set at the altitude at which the device is to operate automatically to open a parachute, or, if he so desires, the flyer may wait to set the altitude knob until after he has gone aloft. In ether event, the device is ready to be taken aloft although the barometric device is not yet set to automatically release the device at the selected altitude.

When the device is taken aloft, the gradually decreasing pressure on the outside of the bellows 70 causes it to raise the rod 86 and link 92, thereby turning the shaft 88 clockwise as viewed in Fig. 3, thus presenting the free end of the trip arm 98 against the free end of the release arm 44. The altitude at which the barometric device will function in this manner depends, of course, on the altitude to which the selector knob 78 is set. The key 100 may now be withdrawn or, at the option of the flyer, it may be left inserted until just before he bails out. When it is withdrawn, the device is still maintained in the set position by engagement of the free end of the trip arm 98 with the free end of the release arm 44 which condition will maintain until the device drops to an altitude where the increasing pressure on the outside of the bellows 70 pulls down on the rod 86 and link 92 and thereby turns the shaft 88 and trip arm 98 anticlockwise, thus releasing the release arm 44 for clockwise rotation, which, acting through the toggle 58, 60, 62 disengages the end of the trip lever 40 from the end of the latch arm 36 at 42, whereby the spring 20 may draw the piston 18 and the cable 26 rightwise to pull the parachute rip cord and open the parachute as in current practice.

Having thus described an embodiment of the invention, I claim:

1. In a parachute release mechanism, the combination of a spring adapted to be put under stress and automatically released to pull a parachute rip cord, latch means to hold said spring stressed, and a barometric device for releasing said latch means which consists of a multiple diaphragm expansible axially by reduction of the external pressure thereon, and adjustable means on one side of said diaphragm for moving said diaphragm bodily in the axial direction, and linkage on the other side of said diaphragm operative to be moved by expansion of said diaphragm into a position for holding said latch means in the latched condition, and operative to be moved by contraction of said diaphragm into a position for unlatching said latch means.

2. In a parachute release mechanism, the combination of a spring adapted to be put under stress and automatically released to operate a parachute release mechanism, latch means to hold said spring means in the stressed condition, and a barometric device for releasing said latch means which consists of a hollow sealed bellows axially expansible by reduction of the external pressure thereon, an adjustable means on one side of said bellows for bodily moving said bellows axially in either direction, and linkage associated with the other side of said bellows operative to be moved by expansion of said bellows into a position for holding said latch means in the latched condition, and operative to be moved by contraction of said bellows into a position to unlatch said latch means.

3. In a parachute release mechanism the combination of a spring adapted to be manually put under stress and automatically released to pull a parachute rip cord, latch means to hold said spring stressed, and a barometric device for releasing said latch means which consists of a hollow round bellows expansible axially by reduction of the external pressure thereon, an adjustable means on one side of said bellows for bodily moving said bellows axially and linkage on the other side of said bellows operative to be moved by axial expansion of said bellows into a position for holding said latch means in the latched condition, and by axial contraction of said bellows to release said latch means, and manual means to maintain said latch means latched independently of said barometric device.

4. Automatic parachute release mechanism which comprises, in combination, a resilient means adapted to be put under stress and automatically released to operate a parachute, latch means to hold said resilient means stressed, a latch release arm, a normally stressed resilient means for operating said latch release arm, power multiplying leverage between said latch release arm and said latch means, whereby said normally stressed resilient means may trip said latch means, a barometric device for arresting operation of said latch release arm to trip said latch means, said barometric device consisting of a hollow sealed expansible means expansible by reduction of the external pressure thereon, an adjustable means on one side of said hollow sealed expansible means for moving said hollow sealed expansible means bodily, and linkage on the other side of said hollow sealed expansible means operative to be moved, by expansion of said hollow sealed expansible means, into engagement with said latch release arm to prevent release of said latch means, and means adapted to engage said latch release arm to prevent release of said latch means independently of said linkage.

5. Automatic parachute release mechanism which comprises, in combination, a heavy spring adapted to be manually put under stress and automatically released to pull a parachute rip cord, latch means to hold said spring stressed, a latch release arm, a light spring for operating said latch release arm, a power multiplying toggle joint between said latch release arm and said latch means through which said light spring may trip said latch means, a barometric device for arresting movement of said latch release arm in a direction to trip said latch means, said barometric device consisting of a hollow sealed bellows axially expansible by reduction of the external pressure thereon, an adjustable means on one side of said bellows for moving said bellows axially, linkage on the other side of said bellows operative to be moved, by axial expansion of said bellows, into engagement with said latch release arm to prevent operation of said latch release arm to release said latch means, and manual means adapted to engage said latch release arm to prevent movement thereof to thereby prevent release of said latch means independently of said linkage.

WILLIAM E. SIRI.

REFERENCES CITED

The following references are of record in the file of this patent:

UNITED STATES PATENTS

| Number | Name | Date |
| --- | --- | --- |
| 2,114,897 | Bird | Apr. 19, 1938 |
| 2,353,440 | Bresee | July 11, 1944 |
| 2,442,108 | Zeller | May 25, 1948 |

FOREIGN PATENTS

| Number | Country | Date |
| --- | --- | --- |
| 129,017 | Great Britain | July 10, 1919 |
| 435,267 | Great Britain | Sept. 16, 1935 |
| 585,265 | Great Britain | Feb. 3, 1947 |